(12) United States Patent
Kikori

(10) Patent No.: US 6,932,054 B2
(45) Date of Patent: Aug. 23, 2005

(54) INTERNAL COMBUSTION ENGINE CONTROLLER

(75) Inventor: Shigeo Kikori, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/948,281

(22) Filed: Sep. 24, 2004

(65) Prior Publication Data

US 2005/0087155 A1  Apr. 28, 2005

(30) Foreign Application Priority Data

Oct. 23, 2003  (JP) .............................. 2003-363126

(51) Int. Cl.$^7$ ............................................. F02D 13/00

(52) U.S. Cl. ................................................... 123/347

(58) Field of Search ............................... 123/321, 322, 123/344, 395, 345, 347, 434

(56) References Cited

U.S. PATENT DOCUMENTS 5,469,818 A * 11/1995 Yoshioka et al. ........ 123/90.15
6,636,797 B2 * 10/2003 Yoshizawa et al. .......... 701/104

FOREIGN PATENT DOCUMENTS

| JP | A 02-040056 | 2/1990 |
| JP | B2 06-092746 | 11/1994 |
| JP | A 2002-285876 | 10/2002 |
| JP | A 2003-206771 | 7/2003 |

* cited by examiner

*Primary Examiner*—Bibhu Mohanty
(74) *Attorney, Agent, or Firm*—Oliff & Berridge, PLC

(57) ABSTRACT

A target intake air mass and a target compression ratio are determined according to the operating condition of an internal combustion engine. A variable compression ratio mechanism is controlled according to the target compression ratio. During this process, a knock limit intake air mass is determined from the actual compression ratio attained by the variable compression ratio mechanism, the smaller one of the knock limit intake air mass and the target intake air mass is set as the final target intake air mass and a variable valve timing mechanism is controlled according to the final target intake air mass.

10 Claims, 6 Drawing Sheets

INTERNAL COMBUSTION ENGINE CONTROLLER

BACKGROUND OF THE INVENTION

1. Field of the Invention

The present invention relates to a control technique for an internal combustion engine. In particular, the invention relates to a knock prevention technique for an internal combustion engine having a variable compression ratio mechanism and a variable valve timing mechanism.

2. Background Art

There are known conventional internal combustion engines having both a variable compression ratio mechanism and a variable valve timing mechanism as described in, for example, Japanese Patent Laid-open No. 2002-285876 (hereinafter referred to as "Patent Document 1"). The variable compression ratio mechanism mechanically changes the compression ratio (mechanical compression ratio). The compression ratio is the ratio of the volume existing within the cylinder when the piston is at the bottom dead center to the clearance-space volume existing therein when the piston is at the top dead center. Various propositions have so far been made concerning the configuration of the variable compression ratio mechanism. The configuration disclosed in Patent Document 1 changes the piston stroke. Those disclosed in Japanese Patent Laid-open No. Hei 2-40056 (hereinafter referred to as "Patent Document 2") and Japanese Patent Publication No. Hei 6-92746 (hereinafter referred to as "Patent Document 3") comprise a dedicated piston for changing the top clearance-space volume in the combustion chamber. The variable valve timing mechanism changes the valve timing of the intake valve. By changing the timing of closing the intake valve, it is possible to change the effective cylinder volume and consequently the effective compression ratio.

In Patent Document 1, a knock prevention technique is disclosed for an internal combustion engine having such a variable compression ratio mechanism and a variable valve timing mechanism as mentioned above. In the case of the knock prevention technique disclosed in Patent Document 1, if knocking is detected, the ignition timing is delayed to instantaneously prevent knocking. After that, the mechanical compression ratio and effective compression ratio are decreased while the ignition timing is being advanced toward the normal timing. That is, it can be said that the knock prevention technique disclosed in Patent Document 1 is a combination of widely-known prior art methods: delaying the ignition timing; decreasing the compression ratio by a variable compression ratio mechanism; and decreasing the effective compression ratio by a variable valve timing mechanism.

In a typical internal combustion engine, the ignition timing is set to the MBT (minimum advance for the best torque) to maximize the combustion efficiency. If the ignition timing is later than the MBT, the decreased combustion efficiency lowers the mileage and deteriorates the exhaust emission although the decreased combustion pressure can prevent knocking. In the above-mentioned prior art technique, although delaying the ignition timing to prevent knocking is instantaneous, the mileage is lowered at least while the ignition timing remains delayed.

SUMMARY OF THE INVENTION

The present invention has been made to solve the above problems and provide an internal combustion engine controller that is capable of preventing a knocking without delaying the ignition timing.

In accordance with one aspect of the present invention, the controller comprises a variable compression ratio mechanism that changes a compression ratio and a variable valve timing mechanism that adjusts an intake air mass by changing a timing of closing an intake valve. Determined from an operating condition of an internal combustion engine are a target intake air mass and a target compression ratio. The variable compression ratio mechanism is controlled according to the target compression ratio. During this process, an actual compression ratio attained by the variable compression ratio mechanism is detected and a knock limit intake air mass is determined from the actual compression ratio. The smaller one of the knock limit intake air mass and the target intake air mass Is set as a final target intake air mass. The variable valve timing mechanism is controlled according to the final target intake air mass.

In accordance with another aspect of the present invention, the controller comprises a variable compression ratio mechanism that changes a compression ratio and a variable valve timing mechanism that adjusts an intake air mass by changing a timing of closing an intake valve. Determined from an operating condition of an internal combustion engine are a target intake air mass and a target compression ratio. The variable compression ratio mechanism is controlled according to the target compression ratio. During this process, an actual compression ratio attained by the variable compression ratio mechanism is detected. A knock limit compression ratio is determined from the target intake air mass. The variable valve timing mechanism is controlled so as to decrease the intake air mass according to a difference between the actual compression ratio and the knock limit compression ratio if the actual compression ratio is larger than the knock limit compression ratio.

Other objects and further features of the present invention will be apparent from the following detailed description when read in conjunction with the accompanying drawings.

DESCRIPTION OF THE PREFERRED EMBODIMENT

First Embodiment

With reference to FIG. 1 through FIG. 8D, the following will describe a first embodiment of the present invention.

Figure 1:
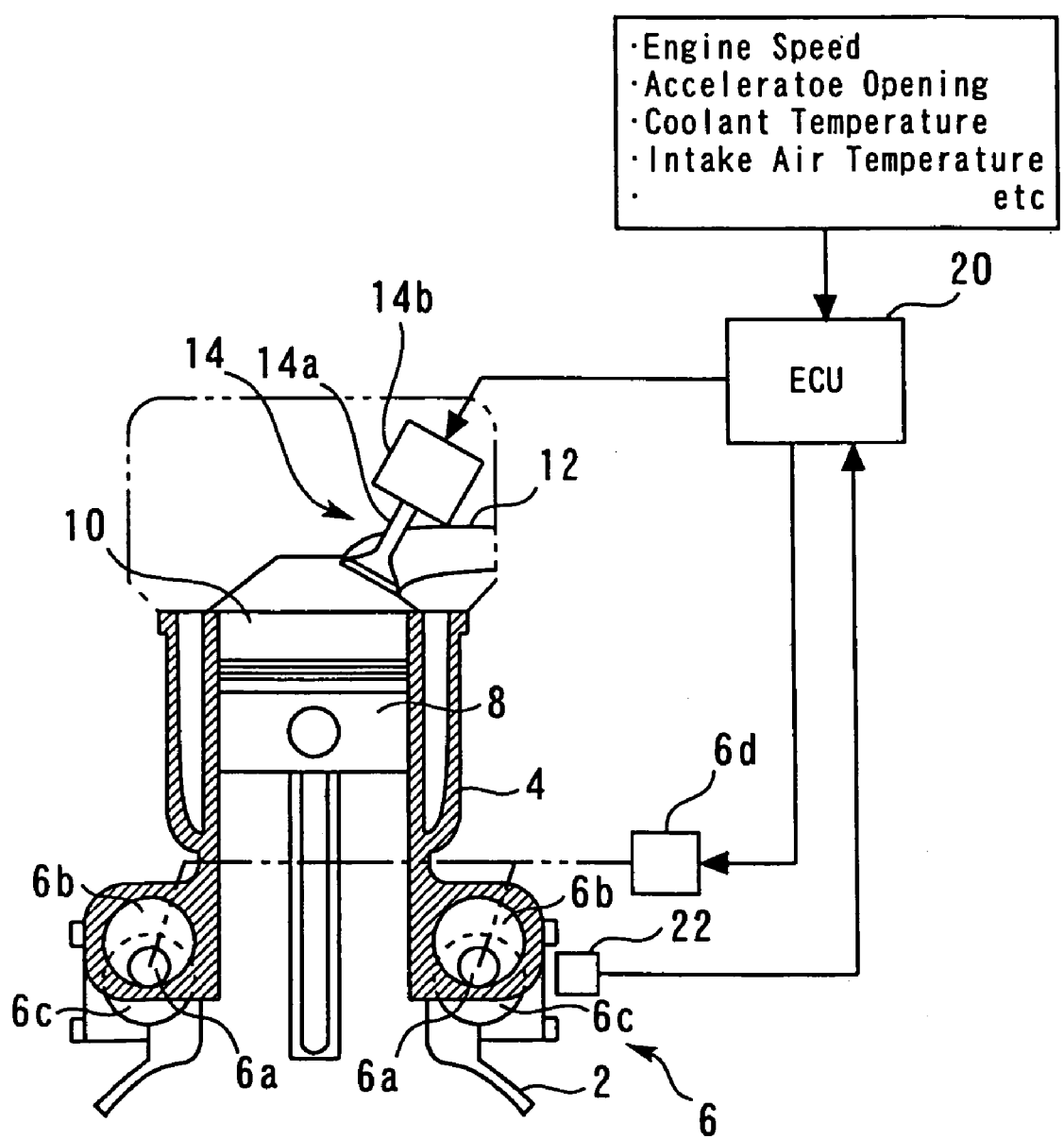
FIG. 1 is shows the schematic configuration of an internal combustion engine according to a first embodiment of the present invention.

FIG. 1 shows the schematic configuration of an internal combustion engine according to the first embodiment of the present invention. As shown in FIG. 1, this internal combustion engine embodiment has a variable compression ratio mechanism (hereinafter referred to as VCR-mechanism) 6 and a variable valve timing mechanism (hereinafter referred to as VVT-mechanism) 14.

As the VCR-mechanism 6, a structure proposed in Japanese Patent Laid-open No. 2003-206771 is used here. This changes the compression ratio by shifting a cylinder block 4 to or from a crankcase 2 in the axial direction of the cylinder. As the means for shifting the cylinder block 4, camshafts are used. Each camshaft comprises a shaft 6a, a cam 6b and a movable bearing 6c. The cam 6b is eccentrically fixed to the central axis of the shaft 6a and has a circular cam profile. The movable bearing 6c has the same profile as the cam 6b and is mounted so that it can rotate eccentrically around the shaft 6a. Respectively, the cam 6b and the movable bearing 6c are rotatably mounted to the cylinder block 4 and the crankcase 2. The shaft 6a is driven by a motor 6d to rotate. This changes the center distance between the cam 6b and the movable bearing 6c, causing the cylinder block 4 to shift to or from the crankcase 2.

In the VCR-mechanism 6, the reciprocating position of the piston 8 in the cylinder changes as the cylinder block 4 shifts to or from the crankcase 2. Accordingly, the clearance-space volume existing within the combustion chamber 19 when the piston 8 is at the top dead center changes although the cylinder capacity, determined by the stroke of the piston 8, does not change. This changes the compression ratio defined as the ratio of the clearance-space volume to the cylinder volume. Note that hereinafter, simple expression "compression ratio" is used to mean a mechanical compression ratio whereas "substantial compression ratio" means an effective compression ratio. Although the change speed of the compression ratio is determined by the speed of the motor 6d, the compression ratio is not instantaneously changed. Rather, it may require more than one cycle for the compression ratio to change completely.

Used as the VVT-mechanism 14 is an electromagnetically driven valve which opens and closes an intake valve 14a with an electromagnetic solenoid 14b. According to the VVT-mechanism 14, it is possible to freely control the opening and closing timings of the intake valve 14a. In particular, since the closing timing of the intake valve 14a can be controlled, it is possible to adjust the mass of air taken into the cylinder or the intake air mass. More specifically, the intake air mass can be increased by shifting the closing timing toward the bottom dead center. When the preset closing timing is earlier than the bottom dead center, the intake air mass can be decreased by further advancing the closing timing. Likewise, when the closing timing is later than the bottom dead center, the intake air mass can be decreased by further retarding the closing timing. Whereas the VCR-mechanism 6 takes some time to change the compression ratio, the VVT-mechanism 14 can instantaneously adjust the intake air mass since the closing timing control of the VVT-mechanism 14 is superior in responsiveness.

The above-mentioned VCR-mechanism 6 and VVT-mechanism 14 are harmonically controlled by an ECU (Electronic Control Unit) 20. The output side of the ECU 20 is connected with the motor 6d of the VCR-mechanism 6 and the electromagnetic solenoid 14b of the VVT-mechanism 14. The input side of the ECU 20 is connected with various sensors such as a compression ratio sensor 22. The compression ratio sensor 22 detects the compression ratio of the internal combustion engine from the position of the cylinder block 4 relative to the crankcase 2. Note that if the motor 6d of the VCR-mechanism 6 is a servomotor, it is possible to calculate the compression ratio from the command value given to the motor 6d. Based on compression ratio information from the compression ratio sensor 22 and such information as engine speed information, accelerator opening information, water temperature information and intake air temperature information from other sensors, the ECU 20 harmonically controls the VCR-mechanism 6 and the VVT-mechanism 14 according to routines shown as flowcharts in FIG. 2 through FIG. 6.

Figure 2:
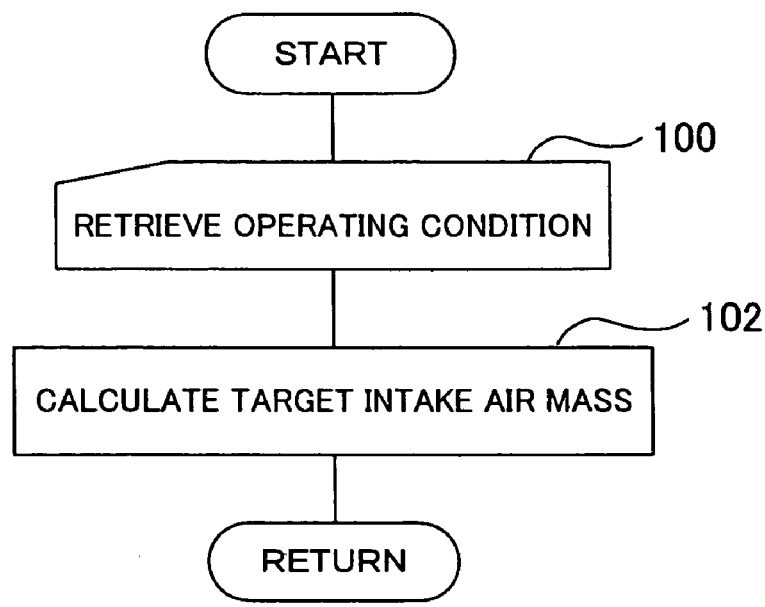
FIG. 2 is a flowchart illustrating a routine for calculating a target intake air mass that is executed in the first embodiment.

The routine shown in FIG. 2 calculates a target intake air mass. The target intake air mass is substantially consistent with the target torque subject to the operating condition since the output torque of a gasoline engine is determined by the intake air mass if the engine operated with theoretical air-fuel ratio. The routine is described in more detail. In the first step 100, the operating condition of the internal combustion engine is retrieved from a plurality of sensors etc. Here, the operating condition refers to the accelerator opening degree, engine speed and other information required for determining the target torque. Based on the operating condition retrieved in step 100, a target intake air mass is calculated in the next step 102 from a map not shown in the figure.

Figure 3:
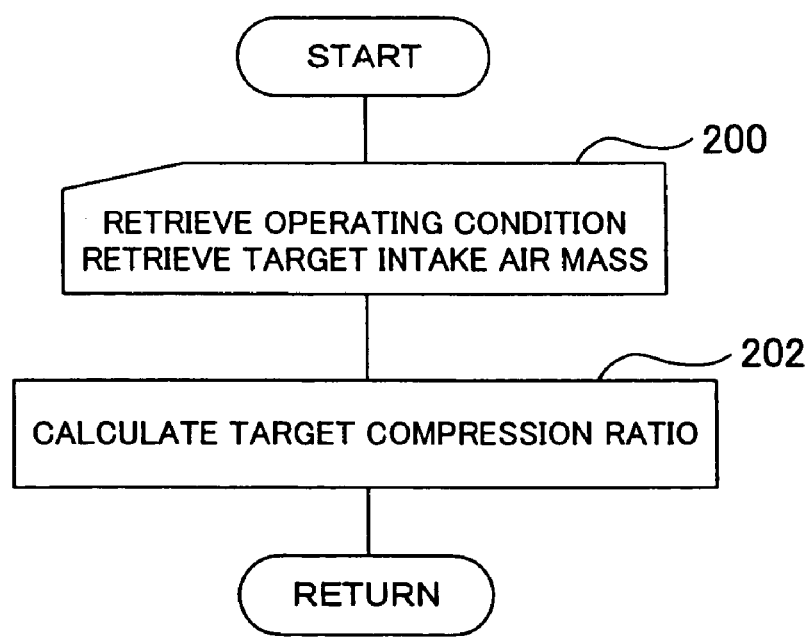
FIG. 3 is a flowchart illustrating a routine for calculating a target compression ratio that is executed in the first embodiment.
Figure 7:
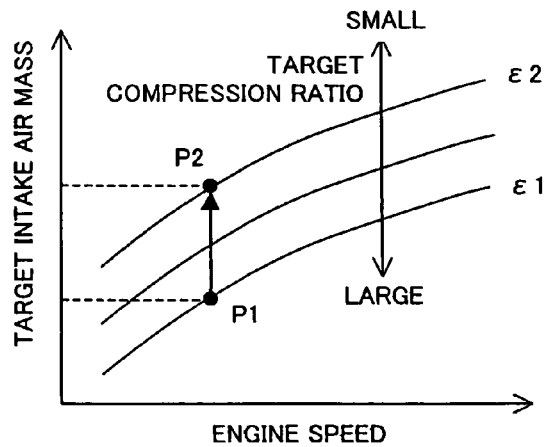
FIG. 7 shows a example of a map showing the relation of an intake air mass, a compression ratio and engine speed.

The routine shown in FIG. 3 calculates a target compression ratio. Target compression ratios are prescribed by a map expressed with parameters: engine speed and target intake air mass. By referring to the map, a compression ratio appropriate for the engine speed and the intake air mass is calculated. The target compression ratio is set so as not to exceed the knock limit which depends on the intake air mass and the engine speed. For example, what is shown in FIG. 7 is used as the map for setting the target compression ratio. For the same engine speed, the larger the target intake air mass becomes, that is, the higher the engine load becomes, the smaller the target compression ratio is set as indicated in this figure. For example, assume that the accelerator pedal, pressed suddenly, has caused a stepped increase in the target intake air mass and moved the operation point from P1 to P2. In this case, the target compression ratio is changed from a high compression ratio e1 to a low compression ratio e2.

More specifically, in the routine of FIG. 3, the operating condition of the internal combustion engine and the target intake air mass are retrieved in the first step 200. The retrieved operating condition of the internal combustion engine includes fuel type information (regular or high-octane) as well as the engine speed. The fuel type is learnt by the result of feedback control. Such a map as shown in FIG. 7 is prepared for each fuel type. In step 202, a map associated with the fuel type is selected and, from the selected map, a compression ratio appropriate to the engine speed and the target intake air mass is calculated as the target compression ratio.

Figure 4:
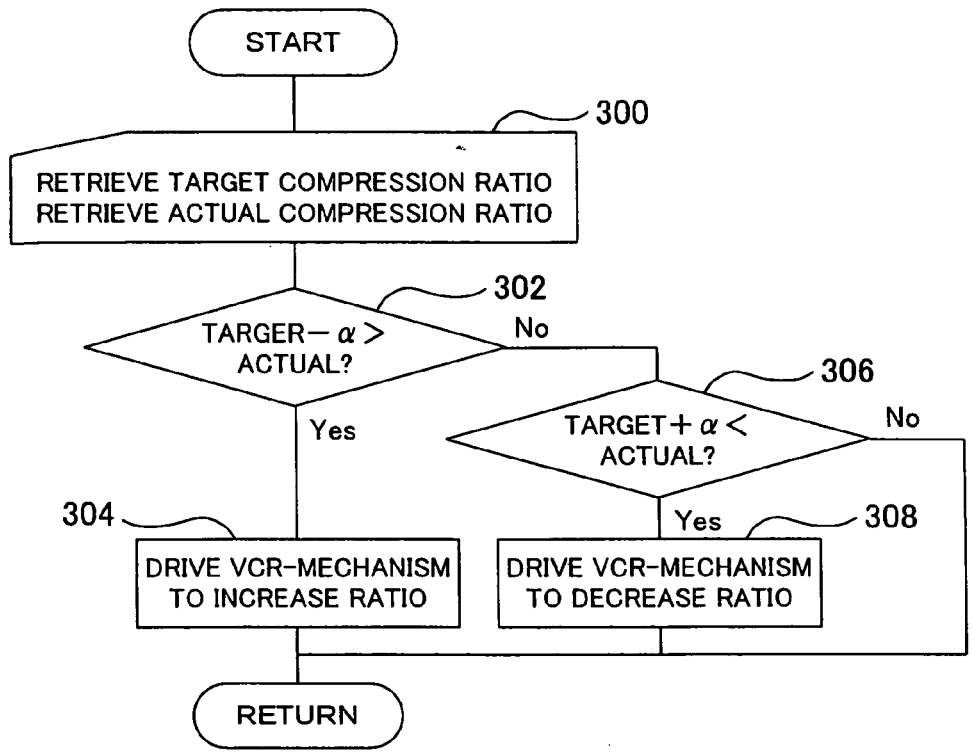
FIG. 4 is a flowchart illustrating a routine for controlling a variable compression ratio mechanism that is executed in the first embodiment.

Aimed at the target compression ratio calculated by the routine of FIG. 3, the routine shown in FIG. 4 controls the VCR-mechanism 6. In the first step 300, the target compression ratio calculated by the routine of FIG. 3 and the current actual compression ratio detected by the compression ratio sensor 22 are retrieved. In step 302, the actual compression ratio is compared with the target compression ratio minus a predefined value α. If the comparison result shows the actual compression ratio is smaller, the VCR-mechanism 6 is driven so as to increase the compression ratio (step 304). If the comparison result in step 302 shows the actual compression ratio is larger, the actual compression ratio is compared in step 306 with the target compression ratio plus the predefined value α. If the comparison result shows the actual compression ratio is larger, the VCR-mechanism 6 is driven so as to decrease the compression ratio (step 308). The range between the target compression ratio minus a and the target compression ratio plus α is a dead zone. If the actual compression ratio falls in this range, the actual compression ratio is left as it is since the VCR-mechanism 6 is not driven.

As mentioned earlier, the target intake air mass is consistent with the target torque. Accordingly, when a high torque is required, for example, during acceleration, a large target intake air mass is set and either the throttle valve, not shown, is opened or the intake valve timing is changed to increase the intake air mass. The mass of air in the cylinder can immediately be changed since control of the intake air mass by the throttle valve or intake valve is superior in responsiveness to that by the VCR-mechanism 6. The knock limit depends on the compression ratio, the intake air mass and the engine speed. If the intake air mass changes, the knock limit compression ratio changes as well. Thus, if the mass of air fed into the cylinder is changed to the target intake air mass, it is also necessary to immediately change the compression ratio to the target compression ratio according to the target intake air mass. However, since it takes some time for the routine of FIG. 4 to change the compression ratio, it is difficult to immediately attain the target compression ratio. That is, since it takes long time to attain the target compression ratio as compared with the attainment of the target intake air mass, the compression ratio in the process of change may exceed the knock limit which depends on the intake air mass.

In the routines shown in FIGS. 5 and 6 and described below, control is performed so as to prevent knocking from occurring due to the response delay of the VCR-mechanism 6. There, focusing on the valve closing timing which can quickly be controlled by the VVT-mechanism 14, the intake air mass is adjusted by the VVT-mechanism 14 so that the compression ratio—intake air mass relation is kept within the knock limit.

Figure 5:
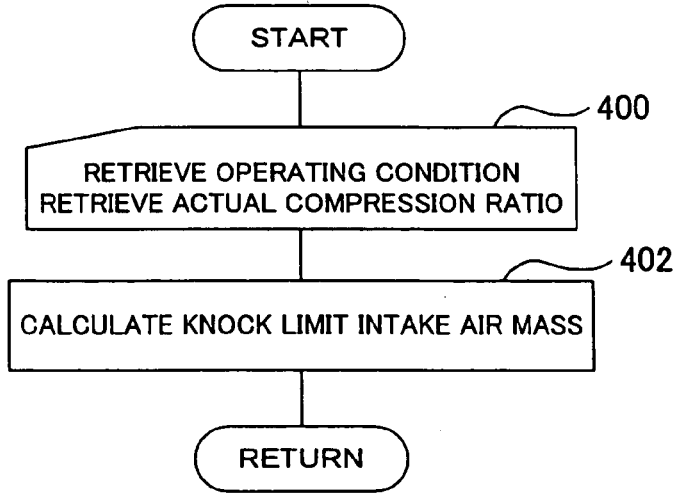
FIG. 5 is a flowchart illustrating a routine for calculating a knock limit intake air mass that is executed in the first embodiment.

More specifically, in the routine shown in FIG. 5, the knock limit intake air mass for the current actual compression ratio is calculated at first. The knock limit intake air mass means the intake air mass at the knock limit. To calculate the knock limit intake air mass, a map is used which is similar to the one used by the routine of FIG. 3 to calculate a target compression ratio. In the first step 400, the operating condition and actual compression ratio of the internal combustion engine are retrieved. The retrieved operating condition of the internal combustion engine includes fuel type information, water temperature information, intake air temperature information as well as engine speed. In step 402, since the occurrence of knocking depends on the fuel properties (octane content, etc.) and compression start temperature, a map for the fuel type is selected at first and then an intake air mass appropriate for the current actual engine speed and compression ratio is retrieved from the selected map. Then, the knock limit intake air mass is determined by correcting the retrieved intake air mass according to the compression start temperature. Note that since the compression start temperature is correlated with the coolant temperature and the intake air temperature, the coolant temperature and/or the intake air temperature, instead of the compression start temperature, may be used as parameter(s) to determine the knock limit intake air mass. For example, the higher the coolant temperature and/or the intake air temperature, the lower the knock limit intake air mass may be determined.

If the compression ratio changes, the knock limit intake air mass changes accordingly. In the process of the compression ratio being changed by the VCR-mechanism 6, the knock limit intake air mass changes in accordance with the changing actual compression ratio. This is described here by using FIG. 7. While the target intake air mass is suddenly changed from an air mass corresponding to operation point P1 to an air mass corresponding to operation point P2, the knock limit intake air mass gradually changes in accordance with the actual compression ratio which changes from e1 to e2. Thus, while the actual compression ratio is changing, the knock limit intake air mass is lower than the target intake air mass. Controlling the VVT-mechanism 14 according to the target intake air mass causes knocking since the mass of air taken into the cylinder exceeds the knock limit.

Figure 6:
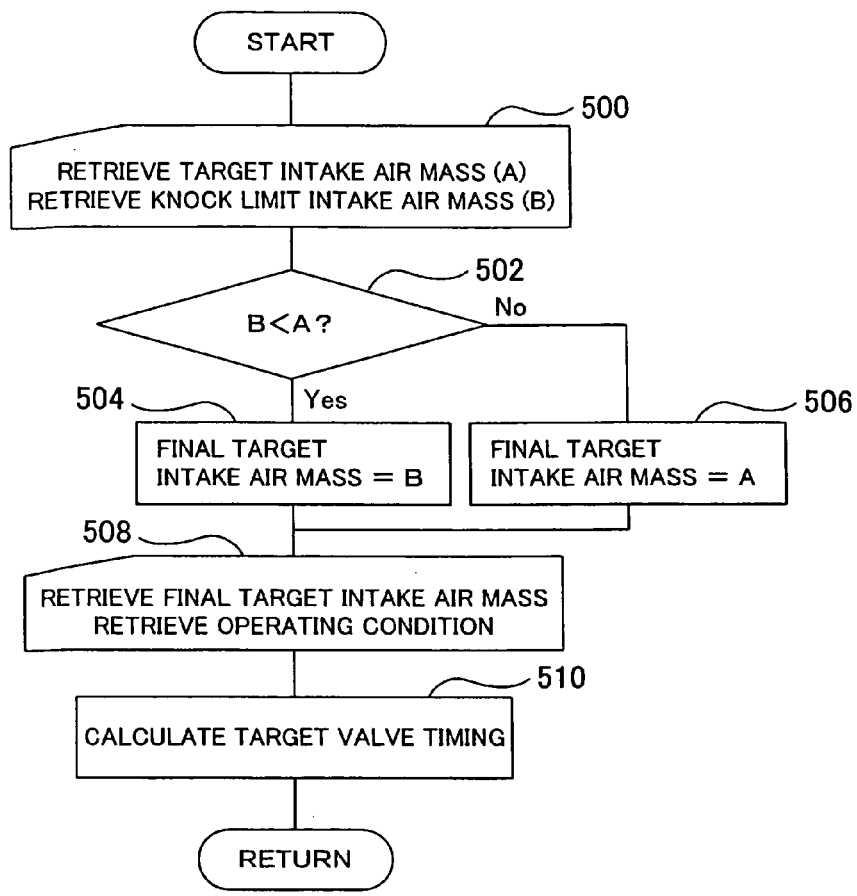
FIG. 6 is a flowchart illustrating a routine for controlling a variable valve timing mechanism that is executed in the first embodiment.

Thus, the VVT-mechanism 14 is controlled according to the routine of FIG. 6. In the routine of FIG. 6, the target intake air mass and the knock limit intake air mass are retrieved at first (step 500). The retrieved target intake air mass and knock limit intake air mass are compared with each other (step 502) and, based on the comparison result, a final target intake air mass is set. If the knock limit intake air mass is smaller than the target intake air mass, the knock limit intake air mass is set as the final target intake air mass (step 504). If the knock limit intake air mass is equal to or larger than the target intake air mass, the target intake air mass is set as the final intake air mass (step 506). In step 508, the final target intake air mass and the operating condition of the internal combustion engine are retrieved. The retrieved operating condition is mainly the engine speed since the cylinder air charging efficiency changes depending on the engine speed. In step 510, a target valve timing is calculated from a map where the engine speed and the intake air mass are parameters. Here, the target valve timing refers to the timing of closing the intake valve 14a.

According to the routine of FIG. 6, if the knock limit intake air mass for the current actual compression ratio is smaller than the target intake air mass, the timing of closing the intake valve 14a is controlled so as to make the intake air mass equal to the knock limit intake air mass. Since control of the valve closing timing by the VVT-mechanism 14 is superior in responsiveness, the intake air mass is quickly adjusted according to the changing actual compression ratio. Thus, since the relation between the intake air mass and the compression ratio is always kept within the knock limit, knocking can be prevented without retarding the ignition timing.

Figure 8A:
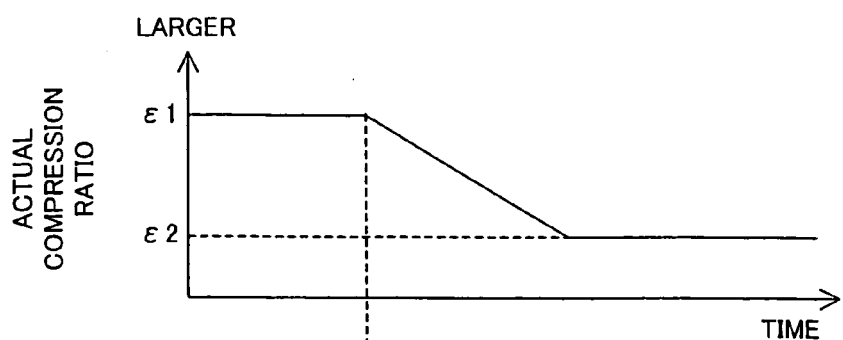
FIGS. 8A through 8D are time charts showing a result of control by the routines of FIG. 2 through FIG. 6.
Figure 8B:
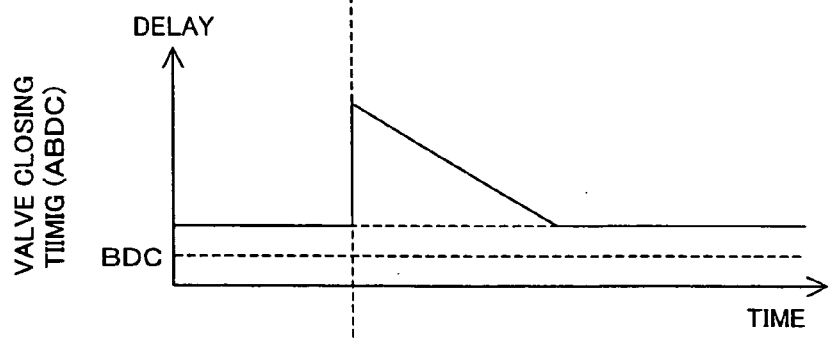
Figure 8C:
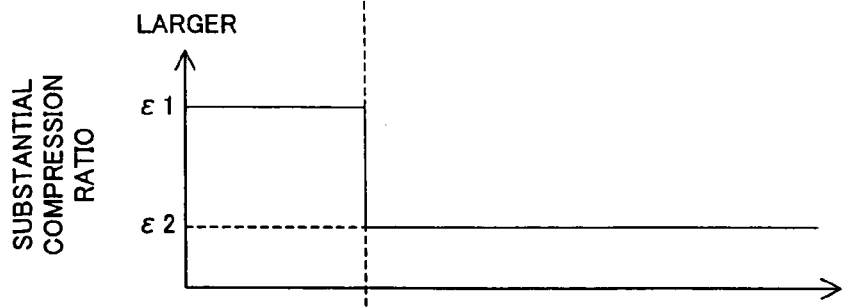
Figure 8D:
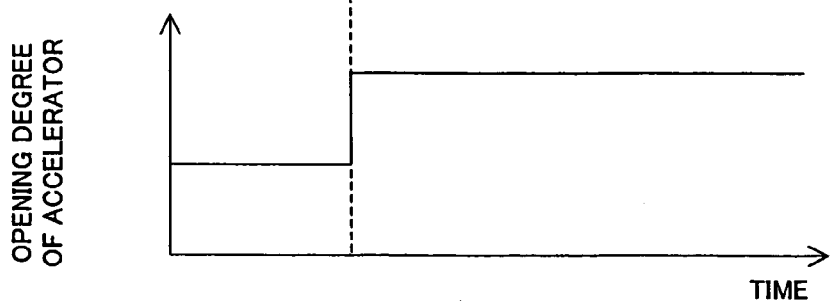

FIG. 8A through FIG. 8D are time charts showing a result of control by the routines of FIG. 2 through FIG. 6. FIG. 8D shows how the opening degree of the accelerator pedal is changed. In this case, a low load condition suddenly switches to a high load condition since the accelerator pedal is strongly pressed. FIG. 8A shows how the actual compression ratio changes with time if the opening degree of the accelerator is changed as shown in FIG. 8D. If the opening degree of the accelerator is changed like a step, the target compression ratio is changed from a target compression ratio $\epsilon 1$ for the low load condition to a target compression ratio $\epsilon 2$ for the high load condition as indicated by a broken line. According to the routine of FIG. 4, the variable compression mechanism 6 is driven to attain the target compression ratio $\epsilon 2$ and, as a result, the actual compression ratio gradually changes from $\epsilon 1$ toward $\epsilon 2$ as indicated by a solid line.

FIG. 8B shows how the closing timing of the intake valve 14a changes with time if the opening degree of the accelerator is changed as shown in FIG. 8D. Here, it is assumed that the closing timing is initially set later than the BDC. Pressing the accelerator pedal immediately maximizes the difference between the actual compression ratio and the target compression ratio $\epsilon 2$ and also the difference between the target intake air mass and the knock limit intake air mass. The timing of closing the intake valve 14a is greatly retarded so as to compensate for the difference between the target intake air mass and the knock limit intake air mass. According as the difference between the actual compression ratio and the target compression ratio $\epsilon 2$ gets smaller, the timing of closing the intake valve 14a is advanced toward the BDC. This quickly adjusts the intake air mass according to the actual compression ratio without allowing the intake air mass—compression ratio relation to exceed the knock limit. Note that the intake air mass can also be adjusted by changing the advance, instead of the delay, of the intake valve 14a closing timing from the BDC.

Changing the timing of closing the intake valve 14a is also to change the substantial compression ratio, that is, the effective compression ratio. By taking into consideration the timing of closing the intake valve 14a, FIG. 8C shows how the substantial compression ratio changes with time. As apparent from this graph, the substantial compression ratio is immediately changed from the target compression ratio $\epsilon 1$ for the low load condition to the target compression $\epsilon 2$ for the high load condition. That is, the routines of FIG. 2 through FIG. 6 are routines to control the substantial compression ratio as targeted by making the VVT-mechanism 14 change the valve closing timing so as to compensate for the retarding compression ratio control of the VCR-mechanism 6.

In the first embodiment mentioned so far, "target value calculation means" is implemented through execution of the routines of FIGS. 2 and 3 by the ECU 20 and "compression ratio control means" is implemented through execution of the routine of FIG. 4. Likewise, "knock limit intake air mass calculation means" is implemented through execution of the routine of FIG. 5 by the ECU 20 and "final target intake air mass setting means" and "intake air mass control means" are implemented through execution of the routine of FIG. 6.

Second Embodiment

Figure 9:
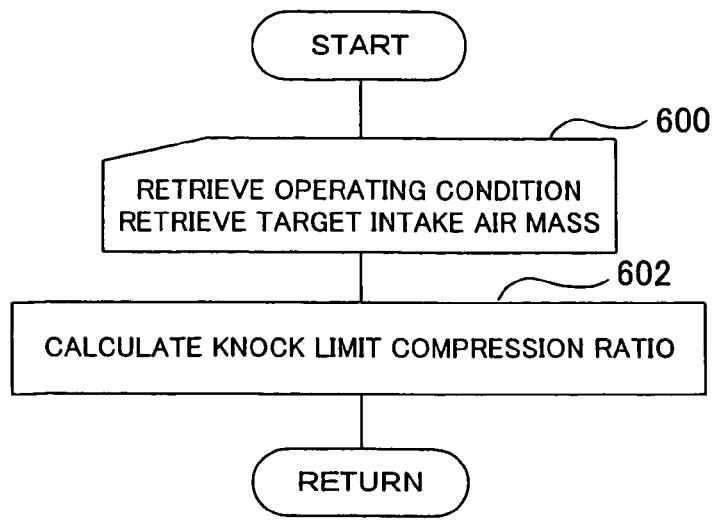
FIG. 9 is a flowchart illustrating a routine for calculating a knock limit intake air mass that is executed in a second embodiment of the present invention.
Figure 10:
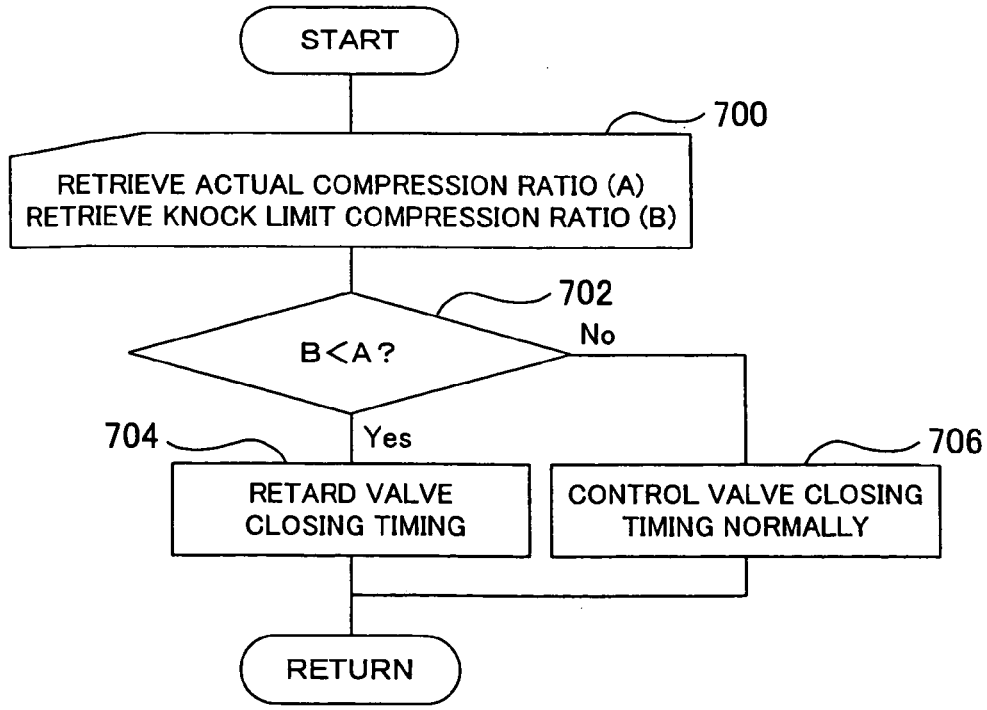
FIG. 10 is a flowchart illustrating a routine for controlling a variable valve timing mechanism that is executed in the second embodiment.

With reference to FIGS. 9 and 10, a second embodiment of the present invention will be described below.

A control unit of this embodiment can be implemented by making the ECU 20 of the first embodiment execute the routine of FIG. 9 instead of the routine of FIG. 5 and the routine of FIG. 10 instead of the routine of FIG. 6.

In the routine of FIG. 9, the knock limit compression ratio for the target intake air mass calculated by the routine of the FIG. 2 is calculated. The "knock limit compression ratio" is the maximum mechanical compression ratio below which nock does not occur. To calculate the knock limit compression ratio, this routine use a map which is similar to the one used by the routine of FIG. 3 to calculate a target compression ratio. However, the knock limit compression ratio is more strictly calculated based on more operating condition information than the target compression ratio. Specifically, in the first step 600, the operating condition of the internal combustion engine and the target intake air mass are retrieved. The retrieved operating condition of the internal combustion engine includes fuel type information, coolant temperature information and intake air temperature as well as the engine speed. In step 602, a map appropriate for the fuel type is selected and, from the selected map, a compression ratio appropriate for the engine speed and target intake air mass is retrieved. In this routine, the knock limit compression ratio is strictly calculated by taking into consideration the coolant temperature and intake air temperature which also have influence on the occurrence of knocking. The knock limit compression ratio is calculated by compensating the retrieved compression ratio for the coolant temperature and intake air temperature.

In the routine of FIG. 10, the actual compression ratio and the knock limit compression ratio are retrieved (step 700) and the retrieved actual compression ratio and knock limit compression ratio are compared with each other (step 702). If the comparison result of step 702 shows that the actual compression ratio is larger than the knock limit compression ratio, the VVT-mechanism 14 controls the timing of closing the valve so as to decrease the intake air mass according to the difference between the actual compression ratio and the knock limit compression ratio (step 704). That is, if the valve opening timing is later than the BDC, the timing is further retarded according to the difference between the actual compression ratio and the knock limit compression ratio. The relation between the timing of closing the intake valve 14a and the difference between the actual compression ratio and the knock limit compression ratio is predefined in a map which is not shown. On the other hand, if the actual compression ratio is not larger than the knock limit compression ratio, the valve closing timing is normally controlled, that is, the timing of closing the intake valve 14a is controlled according to the target intake air mass (step 704).

According to the routine of FIG. 10, the retarding compression ratio control of the VCR-mechanism 6 is compensated for by the valve closing timing control of the VVT-mechanism 14. The substantial compression ratio, which takes into consideration the timing of closing the intake valve 14a, is decreased to the knock limit compression ratio. Thus, the intake air mass—compression ratio relation can always be kept within the knock limit. Like the first embodiment, it is therefore possible to prevent knocking from occurring without delaying the ignition timing. Note that the routine may also be modified so that the substantial compression ratio (effective compression ratio) is adjusted by changing the advance, instead of the delay, of the intake valve 14a closing timing from the BCD.

In the above-mentioned second embodiment, "knock limit compression ratio calculation means" is implemented through execution of the routine of FIG. 9 by the ECU 20. Likewise, "intake air mass control means" is implemented through execution of the routine of FIG. 10.

Others

While the embodiments of the present invention have been described, the present invention is not limited to these embodiments and various modifications may be made thereunto without departing from the spirit of the present invention. For example, the configuration of the VCR-mechanism used in these embodiments is only an example. It is also possible to use such a VCR-mechanism as described in Patent Document 1, 2 or 3.

Likewise, the VVT-mechanism is not limited to the electromagnetically driven valve used in these embodiments. Any type of VVT-mechanism may be used if the timing of closing the valve can be controlled at least. For example, the VVT-mechanism may control the valve closing timing also by changing the phase of the camshaft, making a changeover between lift-different cams. Also note that the present invention places no restrictions on the timing of opening the intake valve. This timing may be determined based on other factors.

Although the internal combustion engine comprises other elements such as an ignition plug, an exhaust valve and an EGR device, they are omitted from FIG. 1 since they are not characteristic to the present invention. Since the present invention can prevent knocking without delaying the ignition timing, it is possible to either set the ignition timing to the MBT or freely determine the timing based on other factors.

In addition, the aforementioned method for calculating a target intake air mass and a target compression ratio is only an example. Other methods can be employed. For example, a target torque may be determined at first from the operating condition including the opening degree of the accelerator and the engine speed. Then, a target compression ratio is calculated from the target torque and a target intake air mass is calculated from the target torque, the engine speed, the target A/F and the like.

The major benefits of the present invention described above are summarized follows:

In the present invention, a target intake air mass and a target compression ratio (target mechanical compression ratio) are determined according to the operating condition of an internal combustion engine. The variable compression ratio mechanism is controlled according to the target compression ratio. Although the target intake air mass and the target compression ratio are set so as not to exceed the knock limit, it is difficult to immediately realize the target compression ratio after the operating condition is changed since it takes some time for the variable compression ratio mechanism to change the compression ratio (mechanical compression ratio).

According to a first aspect of the present invention, while the variable compression ratio mechanism is controlled, a knock limit intake air mass is determined from the actual compression ratio attained by the variable compression ratio mechanism. The variable valve timing mechanism is controlled according to the smaller one of the knock limit intake air mass and the target intake air mass. Since the control of the valve closing timing by the variable valve timing mechanism is superior in responsiveness, it is possible to quickly adjust the intake air mass according to the changing actual compression ratio. According to the first aspect of the present invention, even when the operating condition is changed, the intake air mass—compression ratio relation can always be retained within the knock limit so as to prevent knocking without delaying the ignition timing.

According to a second aspect of the present invention, while the variable compression ratio mechanism is controlled, a knock limit compression ratio is determined from the target intake air mass. If the actual compression ratio attained by the variable compression ratio mechanism is larger than the knock limit compression ratio, the variable valve timing mechanism is controlled so as to decrease the intake air mass according to the difference between the actual compression ratio and the knock limit compression ratio. Since the control of the valve closing timing by the variable valve timing mechanism is superior in responsiveness, it is possible to quickly adjust the intake air mass according to the changing actual compression ratio. According to the second aspect of the present invention, even when the operating condition is changed, the intake air mass—compression ratio relation can always be retained within the knock limit so as to prevent knocking without delaying the ignition timing.

What is claimed is:

1. An internal combustion engine controller comprising:
   a variable compression ratio mechanism which changes a compression ratio;
   a variable valve timing mechanism which adjusts an intake air mass by changing a timing of closing an intake valve;
   target value calculation means for determining a target intake air mass and a target compression ratio from an operating condition of an internal combustion engine;
   compression ratio control means for controlling said variable compression ratio mechanism according to said target compression ratio;
   compression ratio detection means for detecting an actual compression ratio attained by said variable compression ratio mechanism;
   knock limit intake air mass calculation means for determining a knock limit intake air mass from said actual compression ratio;
   final target intake air mass setting means for setting the smaller one of said knock limit intake air mass and said target intake air mass as a final target intake air mass; and
   intake air mass control means for controlling said variable valve timing mechanism according to said final target intake air mass.

2. The internal combustion engine controller according to claim 1, wherein said target value calculation means determines said target compression ratio in accordance with fuel type.

3. The internal combustion engine controller according to claim 1, wherein said knock limit intake air mass calculation means determines said knock limit intake air mass in accordance with fuel type.

4. The internal combustion engine controller according to claim 1, wherein said knock limit intake air mass calculation means determines said knock limit intake air mass in accordance with coolant temperature.

5. The internal combustion engine controller according to claim 1, wherein said knock limit intake air mass calculation means determines said knock limit intake air mass in accordance with intake air temperature.

6. An internal combustion engine controller comprising:
   a variable compression ratio mechanism which changes an compression ratio;
   a variable valve timing mechanism which adjusts an intake air mass by changing a timing of closing an intake valve;

target value calculation means for determining a target intake air mass and a target compression ratio from an operating condition of an internal combustion engine;

compression ratio control means for controlling said variable compression ratio mechanism according to said target compression ratio;

compression ratio detection means for detecting the actual compression ratio attained by said variable compression ratio mechanism;

knock limit compression ratio calculation means for determining a knock limit compression ratio from said target intake air mass; and intake air mass control means for controlling said variable valve timing mechanism so as to decrease the intake air mass according to a difference between said actual compression ratio and said knock limit compression ratio if said actual compression ratio is larger than said knock limit compression ratio.

7. The internal combustion engine controller according to claim 6, wherein said target value calculation means determines said target compression ratio in accordance with fuel type.

8. The internal combustion engine controller according to claim 6, wherein said knock limit compression ratio calculation means determines said knock limit compression ratio in accordance with fuel type.

9. The internal combustion engine controller according to claim 6, wherein said knock limit compression ratio calculation means determines said knock limit compression ratio in accordance with coolant temperature.

10. The internal combustion engine control apparatus according to claim 6, wherein said knock limit compression ratio calculation means determines said knock limit compression ratio in accordance with intake air temperature.

* * * * *